United States Patent [19]
Oswald

[11] Patent Number: 4,501,022
[45] Date of Patent: Feb. 19, 1985

[54] OPTICAL TRANSMISSION SYSTEM AND METHOD

[75] Inventor: Thomas Oswald, Dartford, England

[73] Assignee: International Standard Electric Corporation, New York, N.Y.

[21] Appl. No.: 445,623

[22] Filed: Nov. 30, 1982

[30] Foreign Application Priority Data

Dec. 3, 1981 [GB] United Kingdom ............... 8136508

[51] Int. Cl.³ .............................. H04B 9/00
[52] U.S. Cl. .................................... 455/601; 372/31; 372/33; 455/609; 455/613; 455/618
[58] Field of Search ............... 455/601, 609, 611, 613, 455/617, 618, 606, 607, 612, 43, 72, 112; 372/21, 22, 26, 29, 31, 33; 332/7.51

[56] References Cited

U.S. PATENT DOCUMENTS

4,277,846 7/1981 Chen .................................. 455/613
4,292,606 9/1981 Trimmel .............................. 455/613

OTHER PUBLICATIONS

Smith—Laser Level Control CKT—Electronics Letters Nov. 23, 1978, vol. 14 #24 pp. 775, 776.

*Primary Examiner*—Joseph A. Orsino, Jr.
*Attorney, Agent, or Firm*—John T. O'Halloran; Robert P. Seitter

[57] ABSTRACT

A method and apparatus for optical transmission of an analog signal whose statistical properties approximate "white noise" including a repeater having an optical source, such as a laser, and signal processing means including a quadratic device having a quadratic characteristic arranged to receive the analog signal and provide an output signal to intensity modulate the source, the output signal containing terms which are proportional to the analog input signal and second order terms proportional to the square of the analog input signal, the second order terms being eliminated by a bandwidth filter.

29 Claims, 6 Drawing Figures

TYPICAL DC CHARACTERISTICS OF A GaAs

OPTICAL TRANSMISSION SYSTEM AND METHOD

BACKGROUND OF THE INVENTION

The present invention relates to an optical transmission system and method.

At present optical transmission systems for transmitting data, for example, telephone lines, generally operate with digital signals for reasons which are well known. For example, a digital transmission signal can provide an improved signal-to-noise ratio which means that repeaters may be spaced at a greater distance. For this reason and others, digital optical transmission systems are generally utilized.

If, however, analog optical transmission systems could be utilized then they have the advantage of being able to carry very many signals multiplexed together which allows for an increased signal carrying capacity.

In such an analog system, the multiplexed signals can be considered to produce an overall signal which is similar to "white noise", and it can be statistically predicted that at intervals the peak signal will be very great, which effectively is produced when a large number of the signal peaks of the multiplexed signals are aligned. In an optical transmission signal there are normally repeaters which receive input signals, amplify these input signals and produce an output signal, and the repeaters include an optical signal source which is normally a laser. The laser has a minimum threshold signal level below which distortions occur. Clearly the laser cannot be driven so as to produce a negative signal. The laser can normally also be driven so as to produce a maximum signal of any particular value desired. The laser is driven, however, to produce an analog signal which varies about a mean signal value, the means signal value being set so as to be a particular point above the minimum threshold signal level. If, however, one of the very large peak signals is received by the repeater, then although the laser can reproduce and amplify the positive peak, if the peak value is greater than the difference between the mean signal level and the minimum threshold signal level, the negative-going or lower amplitude part of the analog signal will be cut off and distortion will arise.

SUMMARY OF THE INVENTION

An object of the present invention is to provide a method of optical transmission of an analog signal whose statistical properties approximate "white noise", the analog signal having a means signal value being transmitted by a repeater having a minimum threshold signal value.

Accordingly, a feature of the present invention is the provision of a method of optical transmission of an analog signal whose statistical properties approximate "white noise", the analog signal having a mean signal value and being transmitted by a repeater having a minimum threshold signal value comprising the step of increasing the mean signal value when the peak value of the analog signal is equal to or exceeds the difference between the mean signal value and the minimum threshold signal value.

Preferably the mean signal value is increased so that the minimum value of the analog signal is always of greater value than the minimum threshhold value.

Another object of the present invention is to provide a repeater for an optical transmission system for transmitting an analog signal whose statistical properties approximate "white noise", the repeater having a minimum threshold signal value.

Accordingly, another feature of the present invention is the provision of a repeater for an optical transmission system for transmitting an analog signal having a mean signal value and whose statistical properties approximate "white noise", the repeater having a minimum threshold signal value and comprising first means to detect an input optical signal carrying the analog signal; an optical signal source; second means to drive the source coupled to the source; and signal processing means coupled to the first means, the second means and the source to increase the mean signal value when the analog signal includes peak values which approach or exceed the difference between the mean signal value and the minimum threshold signal value.

Preferably the signal processing means is adapted to increase the mean signal value such that the minimum value of the analog signal is always of greater value than the minimum threshold value.

The signal processing means may include a quadratic device arranged to provide a signal output including terms proportional to the square of the input signal, the repeater including bandwidth limiting means to eliminate from the output signal terms proportional to the square of the input signal.

A further object of the present invention is to provide a repeater for an optical transmission signal for transmitting an analog signal whose statistical properties approximate "white noise".

Accordingly, a further feature of the present invention is the provision of a repeater for an optical transmission system for transmitting an analog signal whose statistical properties approximate "white noise" comprising an optical source; and a device coupled to receive the analog signal and coupled to an input of the source having a quadratic characteristic, the device responding to the analog signal to provide an output signal to intensity modulate the source, the output signal containing terms proportional to the analog signal and second order terms proportional to the square of the analog signal, the second order terms lying outside the bandwidth of the system.

A bandpass filter may be provided to restrict the bandwidth of the system to approximately one octave or less.

There may be provided first means for controlling the mean output power of the source and second means for controlling the modulationg depth of the source.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
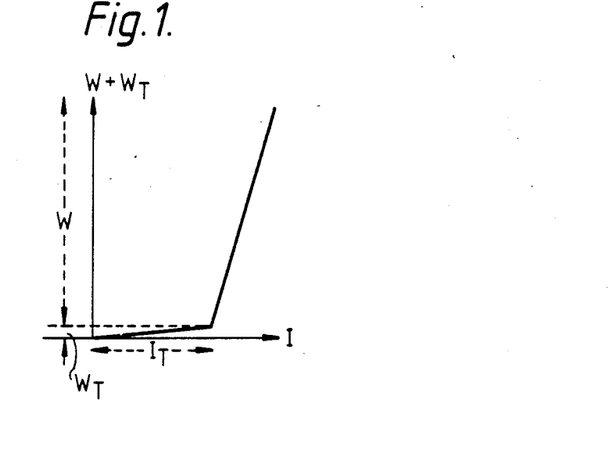
FIG. 1 is a graph of the power to current characteristic of a typical laser.

FIG. 1 shows a graph of the power to current characteristic of a laser. W is the optical power produced by the laser and I is the current driving the laser. It will be noted that there is a threshold drive current $I_T$ (corresponding to a threshold optical power $W_T$) below which the power drops rapidly to zero.

Figure 3:
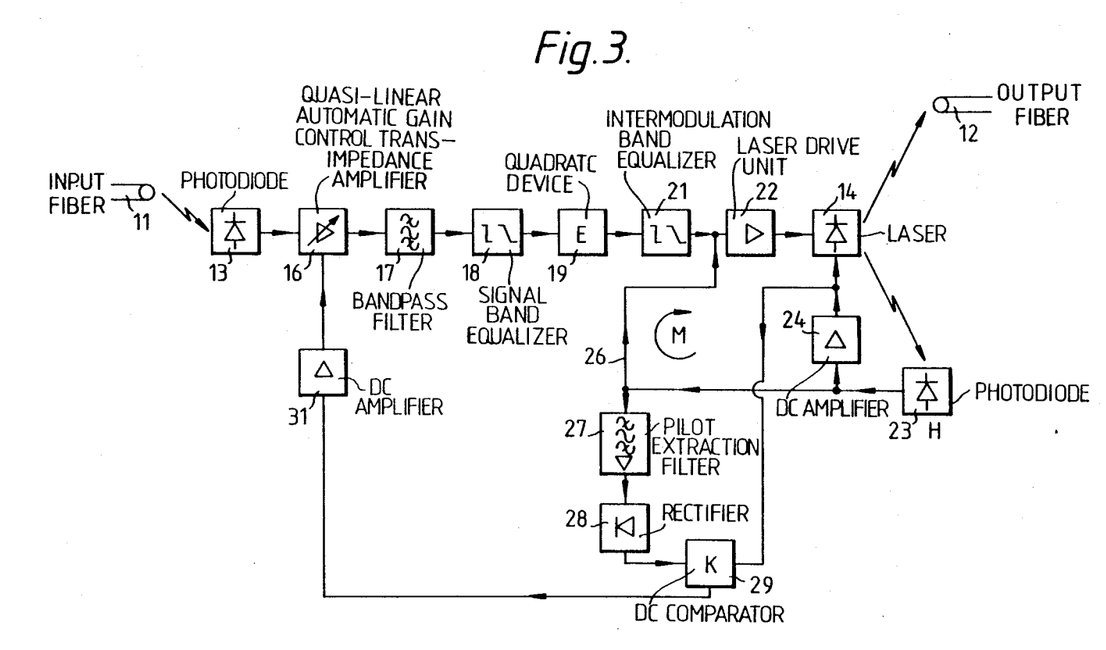
FIG. 3 is a block diagram of a repeater in accordance with the principles of the present invention.

Referring to FIG. 3, it will be understood that in a conventional repeater in an optical transmission system, there is an input optical fiber 11 and an output optical fiber 12, the input optical fiber 11 being connected to a light sensitive means which may be in the form of a photodiode 13, the signal from which is used, after suitable signal processing to drive a laser 14 connected to output optical fiber 12. FIG. 3 illustrates the signal processing means of a repeater according to a preferred embodiment of the present invention. The photodiode 13 passes the electrical signal to a "Quasi-linear" automatic gain control "trans-impedance" amplifier 16, the signal from which is passed to a traffic bandpass filter 17, the signal passing through the bandpass filter 17 to a signal band equalizer 18. The signal from the signal band equalizer 18 is passed to a quadratic device 19 and the signal from the quadratic device 19 is passed to an intermodulation band equalizer 21.

The signal from intermodulation band equalizer 21 is passed to a laser drive unit 22 which in turn controls laser 14. The light output from laser 14 is also viewed by a photodiode 23 which is linear at high light input and the electrical output of photodiode 23 is passed through a DC amplifier 24 to control the mean power of laser 14. The output of photodiode 23 is also passed to an input of laser drive unit 22 via feedback loop 26 as well as to the input to a pilot extraction filter 27, the output of which is passed through a rectifier 28. A DC comparator 29 receives input signals from rectifier 28 and also from amplifier 24 and passes a signal on to a DC amplifier 31 which is used to control amplifier 16.

The laser mean power is controlled by a DC feedback loop from the high power photodiode 23 acting on the back facet of laser 14 and fed back through DC amplifier 24 to laser drive unit 22. The manner in which the laser mean power is controlled is generally similar to that in a conventional digital repeater so that the power in the laser is never less than that able to carry the signal power although the unmodulated power may vary.

The maximum signal power is controlled to a given fraction of the output power, in order to control the modulation depths as follows. A pilot tone is present in an unused part, preferably in the middle of the spectrum of the signal (see FIG. 4). The pilot tone is present at the output of photodiode 23 and is extracted by filter 27 in the form of an LC or crystal filter, rectified by rectifier 28 and compared with a fraction of the DC level from amplifier 24 used to control the laser mean power. This comparison is carried out in comparator 29. Then a DC signal, proportional to the output of comparator 29 is used to control amplifier 16 (which is an automatic gain control amplifier) to constrain the output of the comparator 29 to zero. Amplifier 16 must be quasi-linear and is thus preferably arranged to operate at the input end of the repeater. (By "quasi-linear" is meant freedom from odd, and a high density of high even order intermodulation products). Thus, the modulation depth is held independent of the output power of the laser 14. It may be varied, however, at the sending station connected to the input to the transmission system by controlling the ratio of pilot to traffic levels in the signal.

It will be noted that both the input photodiode 13 and photodiode 23 should be linear devices. Because of the high signal input power the importance of leakage or of dark currents is diminished. Germanium devices would be suitable.

Negative feedback is provided around the laser 14 from photodiode 23 along feedback loop 26 to laser drive unit 22 to reduce quantum and intermodulation noise from laser 14.

The operation of quadratic device 19 will now be described. As already discussed above, laser 14 is a linear device. However, assume that current I driving laser 14 is derived from a voltage v produced by quadratic device 19 so that:

$$I = I_0 + Gv + Hv^2,$$

where $I_0$, $G$, $v$ are constants.

Then from FIG. 1 the lasing optical power (W):

$$W = A[I - I_T] = A[(I_0 - I_T) + Gv + Hv^2] \quad (1)$$
$$= W_0 + gv + hv^2 \, (say)$$

where g and h are constants and $W_0 = A(I_0 - I_T)$.

From this expression, $W_0 + W_T$, is the unmodulated output power and the useful optical power is:

$$2SW_S = gv.$$

Figure 2:
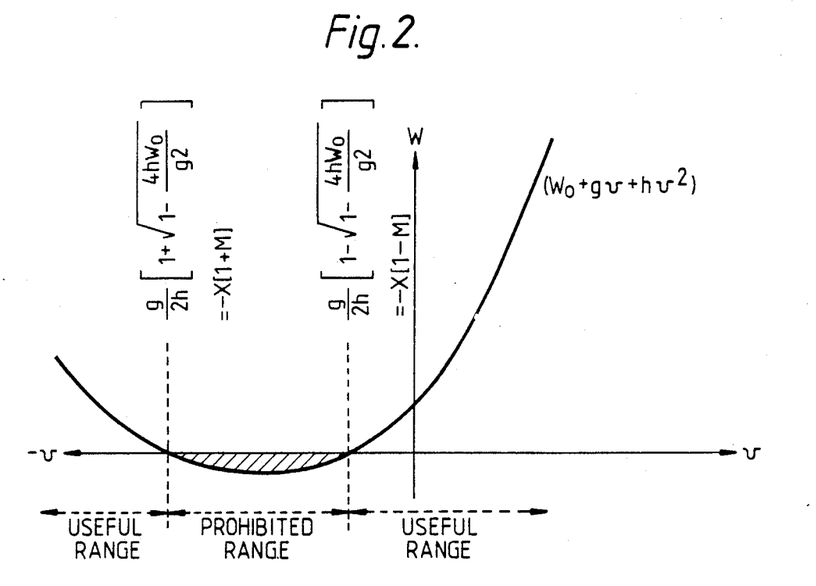
FIG. 2 is a graph of a power to voltage characteristic of a quadratic device for use in the present invention.

The power corresponding to $hv^2$ contains second order intermodulation products of the signal. If the bandwidth of the signal is less than an octave wide (defined by bandpass filter 17), then more of these products fall into the same band as the signal. Their function is to increase the unmodulated power to a value sufficient to sustain W in the positive region as $(W_0 + gv)$ becomes negative. This operation is illustrated in FIG. 2.

Putting $g/2h/ = X$ and $$\sqrt{1 - \frac{2}{X} \frac{W_0}{g}} = M$$

it is seen that there is no limit to the negative excursion of v if M is zero or imaginary, i.e., if $(W_0/g)$ exceeds $(X/2)$.

To the extent that there is an indefinite upper limit to W, the modulation does not then encounter any overload. This statement is also relevant in practice since it will be shown that (due to the nature of the analog signals) high values of W occur for only infinitesimal parts of the time so that there is no thermal limit to the operation.

However, there is a limit to the mean output power of the laser, ($\overline{W}_A$) set, inter alia, by reliability requirements. Also, the current from the receiver optical diode may be regarded as being produced from the laser drive current via a linear transducer so that the output signal current is proportional to $\overline{W}_S$. Since all the sources of noise in this linear transducer are constant if $\overline{W}_A$ is constant, the signal current/noise current ratio is proportional to $\overline{W}_S$. Thus, the improvement, due to quadratic operation over linear operation, in signal/noise ratio for $\overline{W}_A$ constant, is $$20 \log_{10} \frac{\overline{W}_S}{\overline{W}_A} \Big/ \frac{\overline{W}_{SO}}{\overline{W}_A} \quad \text{where} \quad \frac{\overline{W}_{SO}}{\overline{W}_A}$$

is the signal/average power ratio in linear operation ($X \to \infty$, $M = 1$).

The values of X and M which maximize the ratio ($\overline{W}_S/\overline{W}_A$) are of interest. This operation involves the probability function of the analog multiplex X, which, conventionally and by specification, is considered to be a "white" noise signal.

For this the probability [P(v)] that the signal voltage will lie within the range $v \to v + dv$ is:

$$P(v) = \frac{1}{\sqrt{\pi}} \epsilon^{-v^2} dv \tag{1}$$

The probability P(W) that the optical power will lie between the limits W and W+dW is the same, where W and dW are related to V by equation (1).

The probability that the output power encounters the prohibited range of FIG. 2 is then:

$$P(W) = \frac{1}{\sqrt{\pi}} \int_{-X(1+M)}^{-X(1-M)} \epsilon^{-v^2} dv \tag{2}$$

$$= \frac{1}{\sqrt{\pi}} \left\{ \int_{-X(1+M)}^{0} \epsilon^{-v^2} dv + \int_{0}^{-X(1-M)} \epsilon^{-v^2} dv \right\}$$

$$= \tfrac{1}{2} \{ erf[X(1+M)] - erf[X(1-M)] \}$$

$P(W) \to 0$ as $M \to 0$ and to $\tfrac{1}{2} \{1 - erf X(1-M)\} \to \tfrac{1}{2} \left\{ 1 - erf\left(\frac{W_0}{g}\right) \right\}$ in linear operation, where $X \to \infty$ and $M \to 1$.

Equation (2) fixes the maximum value of M, i.e., the minimum value of $W_0$ (the controllable part of the unmodulated power) for a given value of X. Conventionally P(W) is taken as $10^{-5}$.

The signal power and the laser mean output power are also functions of X and M. To calculate these, the sojourn of W in the prohibited area can be neglected, since this is only for an infinitesimally small part of the time.

Then:

$$\overline{W}_A = \frac{\frac{1}{\sqrt{\pi}} \int_{v \to -\infty}^{v \to +\infty} W \epsilon^{-W^2} dW}{\frac{1}{\sqrt{\pi}} \int_{v \to -\infty}^{v \to +\infty} \epsilon^{-W^2} dW} \tag{3}$$

$$= \frac{\int_{-\infty}^{0} (W_0 + gv + hv^2)\epsilon^{-v^2} dv + \int_{0}^{\infty} (W_0 + gv + hv^2)\epsilon^{-v^2} dv}{\int_{-\infty}^{0} \epsilon^{-v^2} dv + \int_{0}^{\infty} \epsilon^{-v^2} dv}$$

$$= \frac{\left( \frac{\sqrt{\pi}}{2} W_0 - \tfrac{1}{2}g + \frac{\sqrt{\pi}}{4} h \right) + \left( \frac{\sqrt{\pi}}{2} W_0 + \tfrac{1}{2}g + \frac{\sqrt{\pi}}{4} h \right)}{\frac{\sqrt{\pi}}{2} + \frac{\sqrt{\pi}}{2}}$$

$$= W_0 + \frac{h}{2}$$

Now $\overline{W}_S$ is a root mean square power, since it eventually produces the RMS signal current at the receive diode. Both are linearly related to the RMS signal voltage, $\overline{v}$. Thus $$\overline{W}_S = \sqrt{\frac{\int_{v \to -\infty}^{v \to +\infty} W_S^2 \epsilon^{-W_S^2} dW_S}{\int_{v \to -\infty}^{v \to +\infty} \epsilon^{-W_S^2} dW_S}} \tag{4}$$

$$= \sqrt{\frac{\int_{-\infty}^{+\infty} g^2 v^2 \epsilon^{-v^2} dv}{\int_{-\infty}^{+\infty} \epsilon^{-v^2} dv}}$$

$$= \frac{g}{\sqrt{2}}$$

Combining equations (3) and (4):

$$\frac{\overline{W}_A}{\overline{W}_S} = \frac{W_0 + \frac{h}{2}}{g/\sqrt{2}} = \sqrt{2} \left( \frac{h}{2g} + \frac{W_0}{g} \right) \tag{5}$$

$$= \frac{1}{\sqrt{2}} \left\{ \frac{1}{2X} + X(1 - M^2) \right\}$$

This ratio is least when $$X = \frac{1}{\sqrt{2(1 - M^2)}}$$

and, when $M \rightarrow 0$:

$$X = \frac{1}{\sqrt{2}} \text{ and } \frac{\overline{W}_A}{\overline{W}_S} = 1$$

However, operation at higher values of X must be considered, since the lowest values (highest second order distortion) may cause these difficulties:
  (i) Small linear term for the quadratic device.
  (ii) High peak laser power, albeit for infinitesimal times.
  (iii) Third order distortion from a combination of the second order term of the quadratic device and any second order curvature of the laser response.

When combining equations (5) and (2), TABLE 1 emerges.

TABLE 1

| X | $\frac{1}{\sqrt{2}}$ | 1 | 1.5 | 2 | 3 | 4 | 6 | $\infty$ |
|---|---|---|---|---|---|---|---|---|
| M (for $P(W) = 10^{-5}$) | $2.15 \times 10^{-5}$ | — | — | $2.42 \times 10^{-4}$ | .0236 | .246 | .498 | 1 |
| $\frac{\overline{W}_S}{\overline{W}_A}$ | 1 | .9428 | .7714 | .6285 | .4468 | .3642 | .3078 | .2345 |
| $\frac{W_0}{\overline{W}_A} = \frac{\overline{W}_S}{\overline{W}_A} \cdot \frac{g}{\overline{W}_S} \cdot \frac{W_0}{g} = \frac{\overline{W}_S}{\overline{W}_A}\left[(1 - M^2)\frac{X}{\sqrt{2}}\right]$ | 0.5 | .666 | .8182 | .8888 or .8889 | .9473 | .9678 | .9819 | 1 |
| Signal/noise advantage over linear operation (db) | 12.60 | 12.09 | 10.35 | 8.56 | 5.60 | 3.83 | 2.36 | 0 |

Thus, the main limitation of intensity modulation, which is that (to avoid driving the laser current below the threshold on negative going parts of positive peaks of the signal) the modulation depth is severely constrained by the peak/mean ratio (conventionally 12.9 db—but here 12.6 db because of asymmetrical limits) of a multiplex signal, is largely removed if there is an optimum adjustment of the quadratic device.

The amount of second order distortion inherent in the above value of X is of interest:

Expressing g in mW/volt for W in mW and h in mW/(volt)$^2$, where mW is equal to milliwatts, the second order distortion margin at v=1 volt is:

$$H_2 = g/h/2 = 4X$$

and $$H_{2(v)} = 4X/v$$

at the mean load $\overline{v}$, where:

$$\overline{v} = \frac{\overline{W}_S}{g} = \frac{1}{\sqrt{2}}$$

(from equation (4))

Extending TABLE 1 we have:

| X | $\frac{1}{\sqrt{2}}$ | 1 | 1.5 | 2 |
|---|---|---|---|---|
| $20 \log_{10} [H_{2(\overline{v})}]_{(db)}$ | 12.0 | 15.1 | 18.6 | 21.1 |

Also, the peak power required from the laser is of interest, which will be higher than for linear operation.

If $\hat{W}$ is the laser peak power which is exceeded for $P(\hat{W})$ part of the time—where, for example, $P(\hat{W})$ could be $10^{-5}$, if interest lies in overload of the signal, or, say, 10% if the interest lies in laser reliability at high powers.

The fraction of the time for which the voltage $$\hat{v} = -X\left[1 - \sqrt{1 - \frac{1}{x^2}\left(\frac{W_0}{h} - \frac{\hat{W}}{h}\right)}\right]$$

is exceeded is (where $\hat{v}$ corresponds to $\hat{W}$, from equation (1)):

$$P(\hat{W}) = \frac{1}{\sqrt{\pi}} \int_{\hat{v}}^{\infty} e^{-v^2} dv = \frac{1}{2}[1 - erf\hat{v}] \text{ or} \quad (6)$$

$$\hat{v} = erf^{-1}[2P(\hat{W}) - 1]$$

where $$\left[1 + \frac{\hat{v}}{X}\right]^2 = 1 - \frac{1}{X^2}\left[\frac{W_0}{h} - \frac{\hat{W}}{h}\right] \quad \text{(from equation (1))} \quad (7)$$

i.e. $\frac{\hat{W}}{W_0} = 1 + \frac{hX^2}{W_0}\left[\left(1 + \frac{\hat{v}}{X}\right)^2 - 1\right]$ and, since $$\frac{W_0}{h} = X^2(1 - M^2)$$

$$\frac{\hat{W}}{W_0} = 1 + \frac{\left(1 + \frac{\hat{v}}{X}\right)^2 - 1}{1 - M^2}$$

$$\therefore \frac{\hat{W}}{\overline{W}_A} = \frac{\hat{W}}{W_0} \cdot \frac{W_0}{\overline{W}_A} = \frac{\hat{W}}{W_0}\left[\frac{X}{\sqrt{2}}(1 - M^2)\right]\frac{\overline{W}_S}{\overline{W}_A} =$$

$$\frac{X}{\sqrt{2}}\left\{\left(1 + \frac{\hat{v}}{X}\right)^2 - M^2\right\}\frac{\overline{W}_S}{\overline{W}_A}$$

From equations (6) and (7) we can construct TABLE 2.

TABLE 2

| X | $\frac{1}{\sqrt{2}}$ | 1 | 1.5 | 2 | $\infty$ | |
|---|---|---|---|---|---|---|
| $\hat{W}/\overline{W}_A$ | 13.856 | 10.748 | 7.416 | 5.589 | 2 | for $P(\hat{W}) = 10^{-5}$ |

TABLE 2-continued

| $\hat{W}/\overline{W}_{.1}$ | 2.595 | 2.416 | 2.102 | 1.874 | 1.300 | for $P(\hat{W}) = \frac{1}{10}$ |

Assuming that there is no quite instantaneous failure mechanism in the laser, these peak to mean power ratios should be reasonable—since 2/1 ratios for 50% of the time would be a normal usage. Very high ratios—for smaller values of P(W)—can be excluded by arranging for the driving devices to overload.

Figure 5:
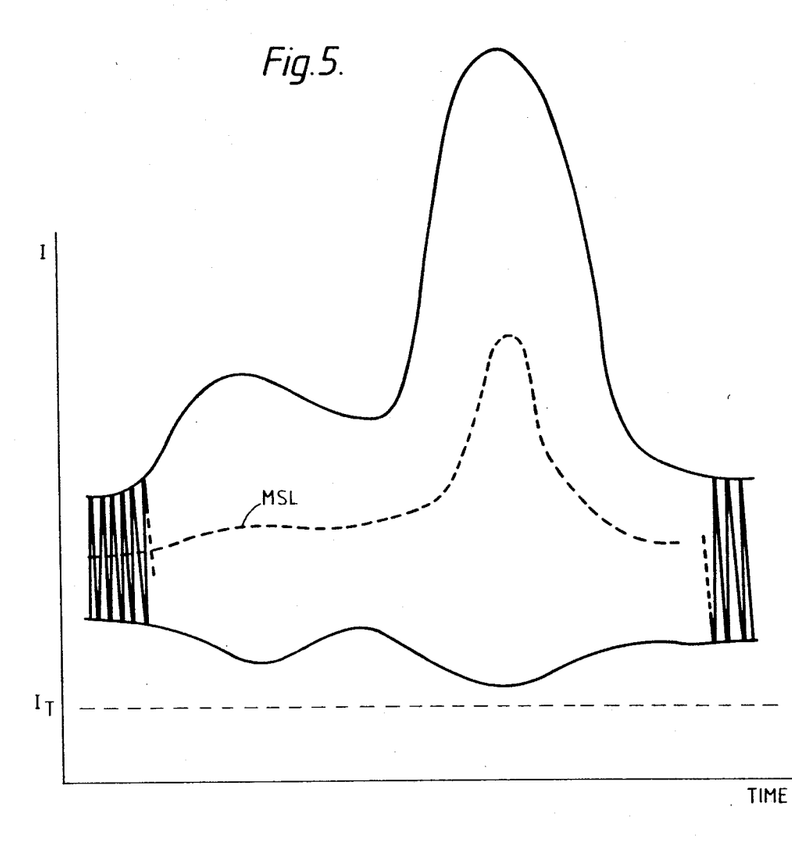
FIG. 5 is a representation of a typical analog signal illustrating the method of the present invention.

The net effect of the use of a quadratic device is shown in simple terms in FIG. 5. So long as the peak value of the analog signal does not exceed the difference between the mean signal level (MSL) and the minimum threshold current value $I_T$ then the mean value remains substantially constant and is only slightly dependent on the peak value. However, when the peak value exceeds this difference then through the quadratic effect the mean value is increased so that the negative going or lower amplitude parts of the analog signal do not fall below the minimum threshold current value $I_T$.

Figure 4:
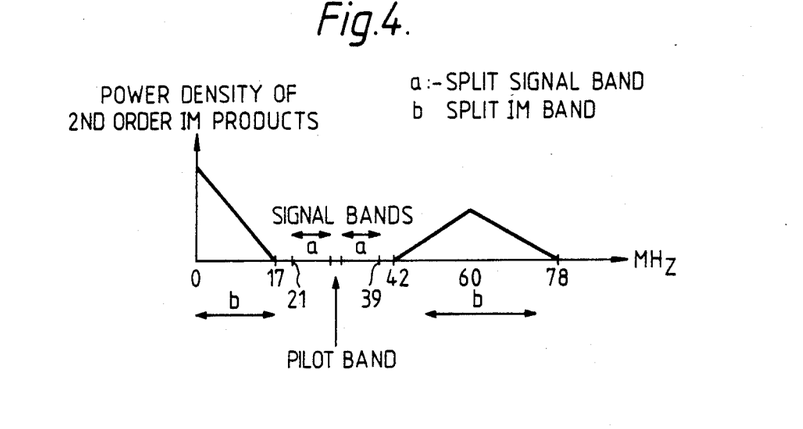
FIG. 4 is a graph of the power density of second order intermodulation products against frequency for a quadratic device utilized in the repeater of FIG. 3.

Devices which respond in ways other than quadratically might be used to overcome the above problem but inevitably any such devices (including quadratic devices) introduce non-linear effects which produce distortions. The advantage of a quadratic device is that these distortions, where they exist, can be eliminated. By restriction of the bandwidth (in terms of edge frequency ratios) a higher even order can be used, but a given bandwidth is transmitted at the lowest mean frequency using a second order device. It is also the easiest even order device to construct. Thus, the frequency distribution of the second order terms is shown in FIG. 4 and it is clear that by arranging a bandpass filter so as to only pass the signal bands (and it is clear from FIG. 4 the signal bands are one octave wide) then the second order terms can be eliminated. In the arrangement shown in FIG. 4 such a bandpass filter should pass frequencies between, say, 20 and 40 MHz. Such a bandpass filter is provided by filter 17.

Bandpass filter 17 also adds sufficient delay dispersion to avoid serious build up of intermodulation products.

The function of intermodulation band equalizer 21 is to ensure that the delay and attenuation of the intermodulation products is the same with respect to the signal at the point of source drive as they are at the output of quadratic device 19—i.e. to correct any response errors in drive unit 22.

To attain a capacity of 5,500 channels for the transmission system an appropriate frequency band would be of 17 MHz traffic width, extending from, say 21 to 39 MHz with a 1 MHz pilot band in the center as is illustrated in FIG. 4. This would exclude, as discussed above, all second order products with three MHz to spare and almost all fourth order products.

It is important in the repeater that the signal path between quadratic device 19 and laser 14 must carry all signals from "Quasi"-DC up to twice the highest signal frequency with an approximately flat amplitude and delay frequency response. Note that no matching characteristic between the sender and receiver is required.

Various forms of quadratic device 19 can be utilized. A quadratic device which may be suitable under some circumstances is described in the magazine article "Use Of A Diode Ring As A Four Quadrant Multiplier" by Richard H. Wilcox, The Review of Scientific Instruments, November 1959, page 1009.

A suitably modified thermionic tube could be used but it is preferable to use suitably arranged Field Effect Transistors (FET) and reference should be made to the book "Field Effect Transistors" by Leone J. Sevin, Jr., Texas Instruments Inc., published by McGraw-Hill Book Co. Item 4.1 describes FET Squaring Circuits.

In the present application, in which the ratio of the second order term to the first order term of quadratic device 19 should be controlled, it is proposed to use a squarer in conjunction with a linear device such that a first order term is added to the output of a squarer to give a precise ratio of second to first order terms. In these circumstances, the precise first order residual output of the squarer is unimportant (affecting merely the level of the first order term that must be subsequently added) so that it is proposed to optimize the operating conditions of the squarer to give a minimum third order term.

Figure 6:
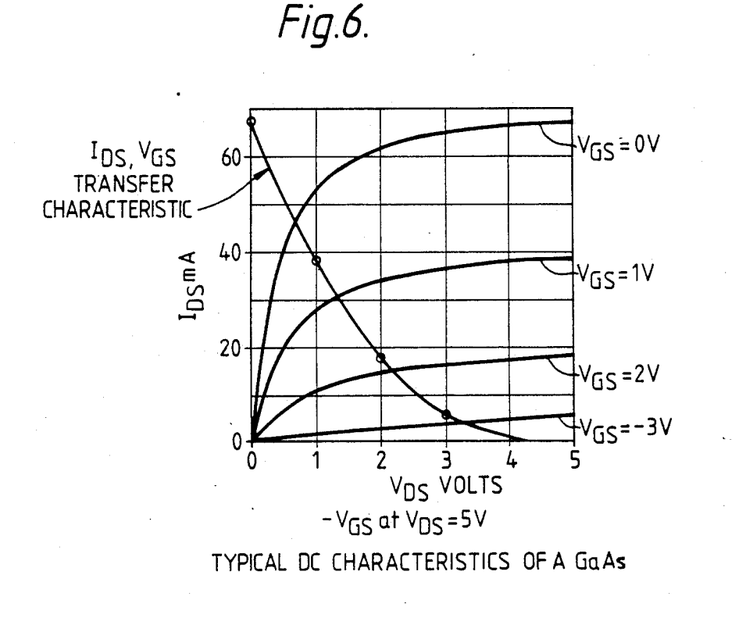
FIG. 6 shows typical d.c. characteristics of a GaAs FET, and the transfer characteristic of a particular FET.

Shown in FIG. 6 is a typical example of a modern GaAs FET suitable for high frequency work. A matched pair of these devices could form a basis of a suitable squarer although ultimately the accuracy of the square law could be improved by control of the impurity density distribution during manufacture—which control is not ordinarily so necessary. The transfer characteristic of a GaAs FET manufactured by the Plessey Company has been shown in FIG. 6 and is suitable for the front end of an Optical Digital Receiver.

It is envisaged that light emitting diodes could be used instead of lasers and in some circumstances may be preferable. The above theories with respect to lasers apply equally to LED's.

While I have described above the principles of my invention in connection with specific apparatus, it is to be clearly understood that this description is made only by way of example and not as a limitation to the scope of my invention as set forth in the objects thereof and in the accompanying claims.

I claim:

1. A method of optical transmission of an analog signal whose statistical properties approximate "white noise", said analog signal having a mean signal value and being transmitted by a repeater having a minimum threshold signal value comprising the step of increasing said mean signal value when the peak value of said analog signal is equal to or exceeds the difference between said mean signal value and said minimum threshold signal value.

2. A method according to claim 1, wherein
said mean signal value is increased so that the minimum value of said analog signal is always greater than said minimum threshold signal value.

3. A repeater for an optical transmission system for transmitting an analog signal having a mean signal value and whose statistical properties approximate "white noise", said repeater having a minimum threshold signal value and comprising:
first means to detect an input optical signal carrying said analog signal;
an optical signal source to transmit said analog signal;
second means to drive said source coupled to said source; and
signal processing means coupled to said first means and said second means to increase said mean signal value when said analog signal includes peak values which approach or exceed the difference between said mean signal value and said minimum threshold signal value.

4. A repeater according to claim 3, wherein said signal processing means includes
   a quadratic device to provide a signal output having terms therein proportional to the square of said analog signal, and
   bandwidth limited means coupled to said quadratic device to eliminate from an output signal of said repeater said terms proportional to the square of said analog signal.

5. A repeater according to claim 3, wherein said signal processing means increases said mean signal value such that the minimum value of said analog signal is always greater than said minimum threshold signal value.

6. A repeater according to claim 5, wherein said signal processing means includes
   a quadratic device to provide a signal output having terms therein proportional to the square of said analog signal, and
   bandwidth limited means coupled to said quadratic device to eliminate from an output signal of said repeater said terms proportional to the square of said analog signal.

7. A repeater for an optical transmission system for transmitting an analog signal whose statistical properties approximate "white noise" comprising:
   an optical source; and
   a device coupled to receive said analog signal and coupled to an input of said source, said device having a quadratic characteristic, said device responding to said analog signal to provide an output signal to intensity modulate said source, said output signal containing terms proportional to said analog signal and second order terms proportional to the square of said analog signal, said second order terms lying outside the bandwidth of said system.

8. A repeater according to claim 7, further including a negative feedback loop coupled to said source to reduce quantum and/or intermodulation noise from said source.

9. A repeater according to claim 7, further including first means coupled to said source to control the mean output power of said source.

10. A repeater according to claim 9, wherein said first means includes
    light sensitive means to receive light from said source, and
    amplifier means coupled to said light sensitive means to amplify an output signal from said light sensitive means for controlling a drive unit coupled to said source.

11. A repeater according to claim 10, further including
    a second means coupled to said source to control the modulation depth of said source.

12. A repeater according to claim 11, wherein said second means includes
    third means to extract a pilot signal from said analog signal, said pilot signal being employed to control the modulation depth of said source.

13. A repeater according to claim 12, wherein said third means includes
    a filter coupled to said light sensitive means to extract said pilot signal; and
    said second means further includes
    a rectifier means coupled to said filter to rectify an output signal therefrom,
    a comparator coupled to said rectifier means and a DC level to provide an error signal, and
    fourth means coupled to an input of said quadratic device and said comparator to control said analog signal coupled to said quadratic device in accordance with said error signal.

14. A repeater according to claim 13, further including
    a negative feedback loop coupled from said light sensitive means to said drive unit to reduce quantum and/or intermodulation noise from said source.

15. A repeater according to claim 7, further including first means coupled to said source to control the modulation depth of said source.

16. A repeater according to claim 15, wherein said first means includes
    second means to extract a pilot signal from said analog signal, said pilot signal being employed to control the modulation depth of said source.

17. A repeater according to claim 16, wherein said first means further includes
    a rectifier means coupled to said second means to rectify an output signal therefrom,
    a comparator means coupled to said rectifier means and a DC level to provide an error signal, and
    third means coupled to an input of said quadratic device and said comparator to control said analog signal coupled to said quadratic device in accordance with said error signal.

18. A repeater according to claim 17, further including
    a negative feedback loop coupled to said source to reduce quantum and/or intermodulation noise from said source.

19. A repeater according to claim 7, further including a bandpass filter to couple said analog signal to said device to restrict the bandwidth of said system to approximately one octave or less.

20. A repeater according to claim 19, further including
    first means coupled to said source to control the mean output power of said source.

21. A repeater according to claim 20, wherein said first means includes
    light sensitive means to receive light from said source, and
    amplifier means coupled to said light sensitive means to amplify an output signal from said light sensitive means for controlling a drive unit coupled to said source.

22. A repeater according to claim 21, further including
    a negative feedback loop coupled from said light sensitive means to said drive unit to reduce quantum and/or intermodulation noise from said source.

23. A repeater according to claim 21, further including
    second means coupled to said source to control the modulation depth of said source.

24. A repeater according to claim 23, wherein said second means includes
    third means to extract a pilot signal from said analog signal, said pilot signal being employed to control the modulation depth of said source.

25. A repeater according to claim 24, wherein
said pilot signal lies within the bandwidth of said system.

26. A repeater according to claim 25, wherein
said third means includes
    a filter coupled to said light sensitive means to extract said pilot signal; and
said second means further includes
    a rectifier means coupled to said filter to rectify an output signal therefrom,
    a comparator coupled to said rectifier means and a DC level to provide an error signal, and
    fourth means coupled to an input of said quadratic device and said comparator to control said analog signal coupled to said quadratic device in accordance with said error signal.

27. A repeater according to claim 26, further including
    a negative feedback loop coupled from said light sensitive means to said drive unit to reduce quantum and/or intermodulation noise from said source.

28. A repeater according to claim 24, wherein
said third means includes
    a filter coupled to said light sensitive means to extract said pilot signal; and
said second means further includes
    a rectifier means coupled to said filter to rectify an output signal therefrom,
    a comparator coupled to said rectifier means and a DC level to provide an error signal, and
    fourth means coupled to an input of said quadratic device and said comparator to control said analog signal coupled to said quadratic device in accordance with said error signal.

29. A repeater according to claim 28, further including
    a negative feedback loop coupled from said light sensitive means to said drive unit to reduce quantum and/or intermodulation noise from said source.

* * * * *